(12) United States Patent
Janarthanam et al.

(10) Patent No.: US 8,075,329 B1
(45) Date of Patent: Dec. 13, 2011

(54) METHOD AND SYSTEM FOR PREVENTING DISENGAGEMENT BETWEEN AN ELECTRICAL PLUG AND A CHARGE PORT ON AN ELECTRIC VEHICLE

(75) Inventors: Suriyaprakash Ayyangar Janarthanam, Westland, MI (US); Mark J Ferrel, Brighton, MI (US); Wayne Haider, Dearborn, MI (US); Richard Allen Scholer, Farmington Hills, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/796,256

(22) Filed: Jun. 8, 2010

(51) Int. Cl.
    *H01R 13/62* (2006.01)
(52) U.S. Cl. ........................ 439/304; 439/310
(58) Field of Classification Search .............. 439/310, 439/304, 133
    See application file for complete search history.

(56) References Cited

U.S. PATENT DOCUMENTS

| | | | |
|---|---|---|---|
| 3,904,947 A | | 9/1975 | Crews |
| 5,350,312 A | * | 9/1994 | Kuno et al. ............... 439/310 |
| 5,417,579 A | * | 5/1995 | Yoshioka et al. ............ 439/310 |
| 5,458,496 A | * | 10/1995 | Itou et al. ................... 439/34 |
| 5,545,049 A | * | 8/1996 | Hasegawa et al. ............ 439/310 |
| 5,627,448 A | | 5/1997 | Okada et al. |
| 5,674,086 A | * | 10/1997 | Hashizawa et al. .......... 439/310 |
| 5,676,560 A | * | 10/1997 | Endo et al. .................. 439/310 |
| 6,123,569 A | * | 9/2000 | Fukushima et al. ......... 439/456 |
| 6,203,355 B1 | | 3/2001 | Neblett et al. |
| 6,520,782 B2 | * | 2/2003 | Mori ............................ 439/138 |
| 2008/0185991 A1 | | 8/2008 | Harris et al. |
| 2009/0286414 A1 | | 11/2009 | Ohtomo |
| 2011/0034053 A1 | * | 2/2011 | Matsumoto et al. ......... 439/304 |

FOREIGN PATENT DOCUMENTS

| | | |
|---|---|---|
| DE | 102007002025 A1 | 7/2008 |
| JP | 7115710 A | 5/1995 |
| JP | 10262303 A | 9/1998 |
| WO | 2010115927 A1 | 10/2010 |
| WO | 2011000776 A1 | 1/2011 |
| WO | 2011062004 A1 | 5/2011 |
| WO | 2011092431 A1 | 8/2011 |

\* cited by examiner

*Primary Examiner* — Hae Moon Hyeon
(74) *Attorney, Agent, or Firm* — David B. Kelley; Brooks Kushman P.C.

(57) ABSTRACT

A system and method is provided for preventing disengagement between an electrical plug and a charge port on an electric vehicle. One or more projections are disposed on the electric vehicle. The projection has an extended locked position and a retracted unlocked position. An actuator selectively extends and retracts the projection between the locked and unlocked positions. When the projection is in the locked position, the projection engages the plug and prevents disengagement of the plug and the port.

20 Claims, 4 Drawing Sheets

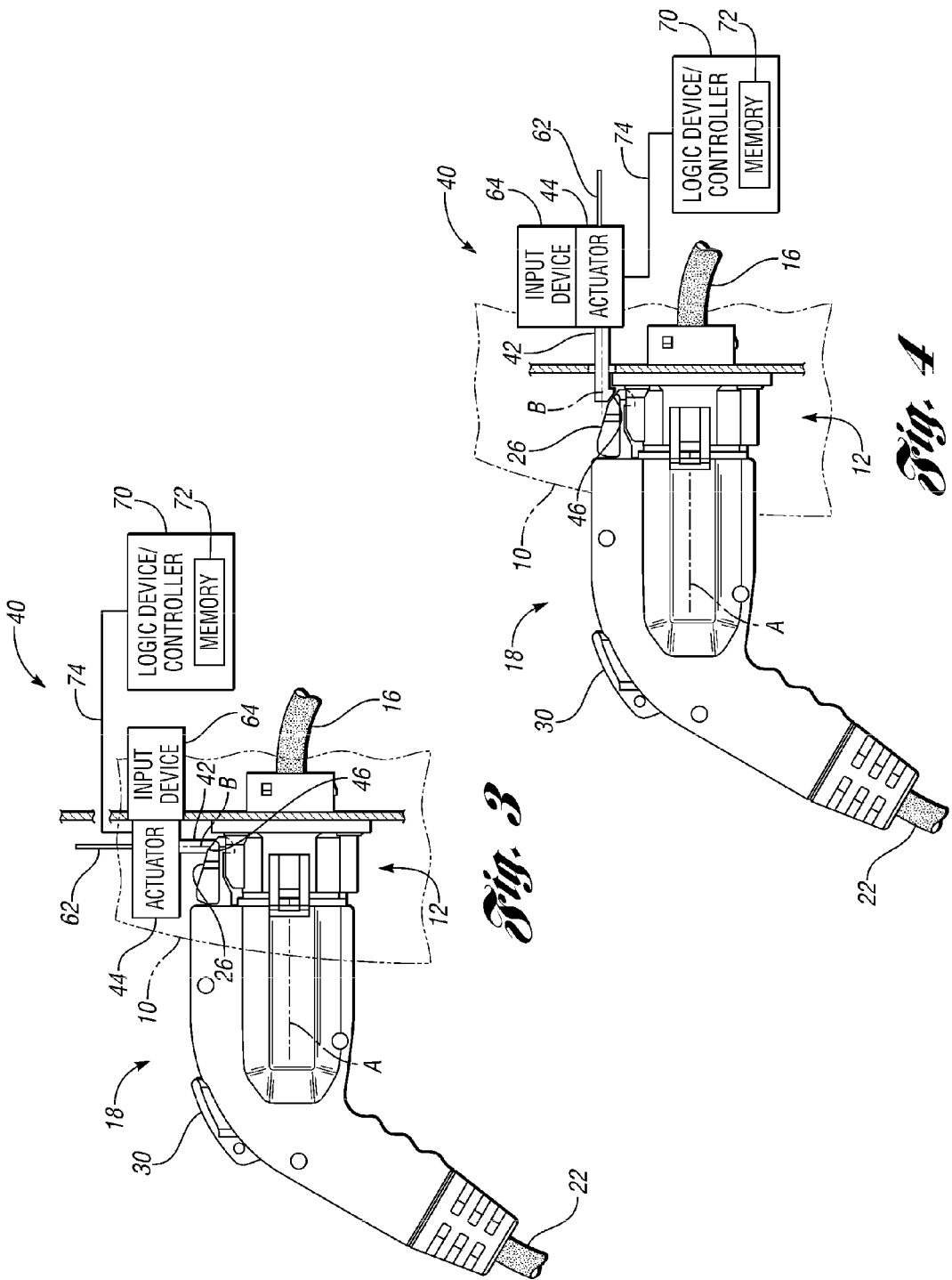

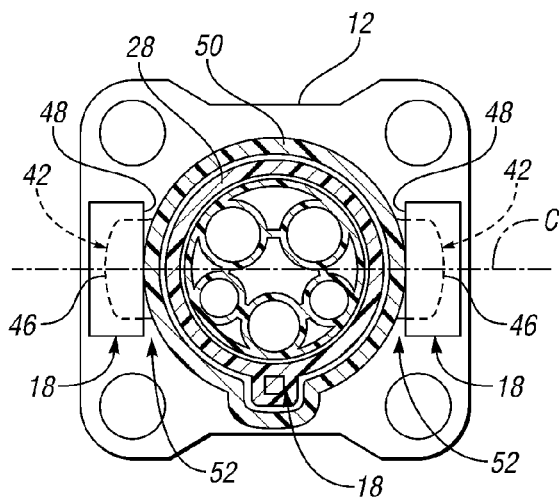
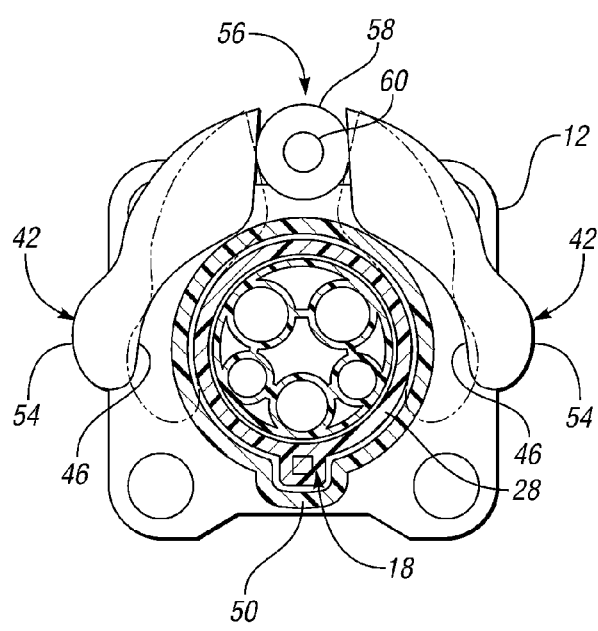
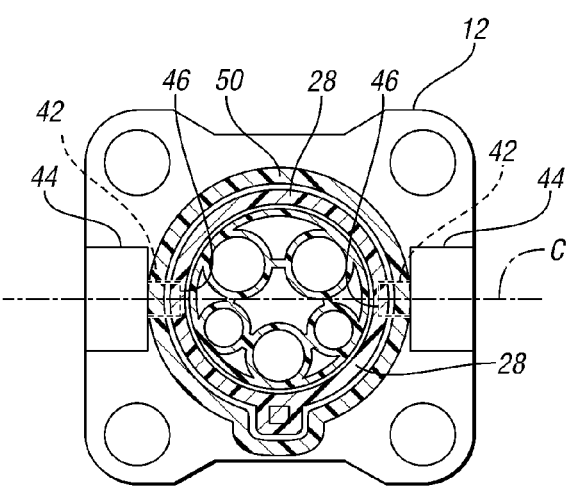

METHOD AND SYSTEM FOR PREVENTING DISENGAGEMENT BETWEEN AN ELECTRICAL PLUG AND A CHARGE PORT ON AN ELECTRIC VEHICLE

BACKGROUND

1. Technical Field

The present invention generally relates to engagement between an electrical plug and a charge port on a vehicle.

2. Background Art

A battery electric vehicle (BEV), plug-in hybrid electric vehicle (PHEV), and a fuel cell vehicle (FCV) generally include a high-voltage storage battery. In operation, the storage battery provides electric power to operate various components in the vehicle, such as an electric motor for driving traction wheels on the vehicle. The storage battery has a state of charge (SOC) and generally includes a plurality of electrochemical cells. The cells store electric charge for the battery, and the SOC of the battery is based on the amount of electric charge in the cells. However, the SOC of the storage battery can decrease when the storage battery provides electric power for the vehicle.

The SOC of the battery decreases when the storage battery loses electric charge or discharges. When the storage battery discharges, it may be desirable or necessary to charge the storage battery. Consequently, a power source external to the vehicle is often used to charge the storage battery to increase the overall SOC of the storage battery.

Various connector assemblies have been proposed to electrically connect the storage battery to the power source for charging the storage battery in the vehicle. For example, the connector assembly may include a vehicle-side connector housing and vehicle-side terminals. The vehicle-side connector housing is mounted on the body of the vehicle. The vehicle-side terminals are enclosed in the vehicle-side connector housing and are connected to the storage battery of the vehicle. In addition, the connector assembly may include a power-source-side connector having a power-source-side connector housing and power-source-side terminals enclosed in the power-source-side connector housing. The power-source-side connector housing mates with the vehicle-side connector housing so that the power-source-side terminals can connect to the vehicle-side terminals.

After mating of the power-source-side connector housing and the vehicle-side connector housing, a person may not want to supervise or attend to various issues or situations that may arise during charging of the battery. For example, the person may not want to attend to ensuring the power-source-side connector and the vehicle-side connector remain properly mated during charging of the battery. Similarly, the person may not wish to attend to preventing others from interrupting charging of the battery.

After mating of the power-source-side connector housing and the vehicle-side connector housing, theft prevention or deterrence may be desirable or necessary. For example, preventing or deterring theft of a cord set, which may include the power-source-side connector housing and power-source-side terminals. Furthermore, it may be beneficial to prevent or deter theft of electric power outputted from the power-source-side terminals. For example, this may occur at a charging station when a first person leaves the vehicle unattended at the charging station and a second person decides to charge his vehicle using electric power owned by, paid by, or otherwise associated with the first person.

SUMMARY

Various embodiments of a system or method are provided for preventing disengagement between an electrical plug and a charge port on an electric vehicle.

The system includes an actuator and at least one projection disposed on the vehicle. The projection has an extended locked position and a retracted unlocked position. The actuator selectively extends and retracts the projection between the locked and unlocked positions. When the projection is in the locked position, the projection engages the plug and prevents disengagement of the plug from the port.

The method includes obtaining authorization to move a projection disposed on the electric vehicle and, in response to the authorization, controlling actuation to extend the projection to a locked position to engage the electrical plug to prevent disengagement between the plug and the charge port.

BRIEF DESCRIPTION OF THE DRAWINGS

FIG. 3 is a schematic diagram illustrating a system including an actuator and a projection for preventing disengagement between the charge port and the electrical plug in accordance with one embodiment;

FIG. 4 is a schematic diagram like FIG. 3, but illustrating the actuator and the projection in accordance with another embodiment;

FIG. 5 is a schematic diagram illustrating the system including projections in the charge port to engage the electric plug in accordance with one embodiment;

FIG. 6 is a schematic diagram illustrating the system including wing-like projections to engage the electric plug in accordance with one embodiment;

FIG. 7 is a schematic diagram illustrating the system including projections to engage a cylindrical cover of the electric plug in accordance with one embodiment.

DETAILED DESCRIPTION

Embodiments of the present disclosure generally provide a method and system for preventing disengagement between an electrical plug and a charge port on an electric vehicle.

Figure 1:
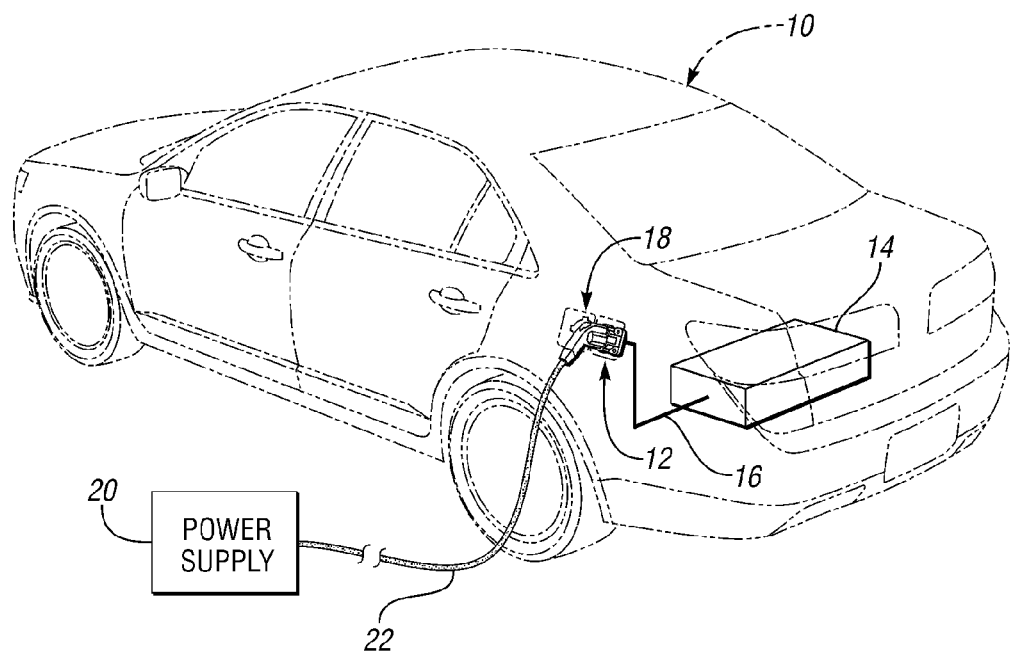
FIG. 1 is a schematic diagram illustrating an electric vehicle with a charge port and an electrical plug with a power supply in accordance with one embodiment.

With reference to FIG. 1, an electric vehicle 10 (hereinafter "vehicle") is provided with a charge port 12. The vehicle 10 may be any type of electric vehicle that includes the charge port 12 for receiving electric power, such as a plug-in electric vehicle, a plug-in hybrid electric vehicle (PHEV), a battery electric vehicle (BEV), a pure electric vehicle, etc.

The charge port 12 of FIG. 1 is shown connected to a storage battery 14, such as a high-voltage electric storage battery that outputs and stores high-voltage electric power for the vehicle 10. However, the charge port 12 may be connected to other electric devices or components in the vehicle 10 that operate on electric power.

As shown in FIG. 1, an electrical wire or cable 16 in the vehicle 10 electrically connects the charge port 12 and the storage battery 14. The vehicle 10 may have other electrical wires or cables (not shown) from the charge port 12 to the other electric devices or components in the vehicle 10.

Referring again to FIG. 1, an electrical plug 18 is provided to facilitate transferring electric energy from a power supply 20 to the vehicle 10. The power supply 20 may be a home power outlet or a charging station. The power supply 20 may be a direct current (DC) power source and/or an alternating current (AC) power source. For example, the power supply 20 may provide a 120-volt or 240-volt AC single-phase nominal supply voltage.

As illustrated in FIG. 1, a charge cord 22 electrically connects the power supply 20 and the plug 18. However, other conductive cables or devices may be used in place of the charge cord 22 to electrically connect the power supply 20 and the plug 18.

As shown in FIG. 1, the electrical plug 18 is removably inserted in the charge port 12. When the plug 18 is properly inserted in the charge port 12, the plug 18 and the charge port 12 mate and an electrical connection is made between electrical contacts in the charge port 12 and electrical contacts 24 in the plug 18 (shown in FIG. 2). The electrical contacts in the charge port 12 may disposed within one or more of the five circular ports defined in the charge port 12 as illustrated in FIGS. 5-7. When the charge port 12 and the plug 18 are electrically connected, the vehicle 10 can receive electric power from the power supply 20, for example, to charge the battery 14 to a higher state of charge (SOC).

Figure 2:
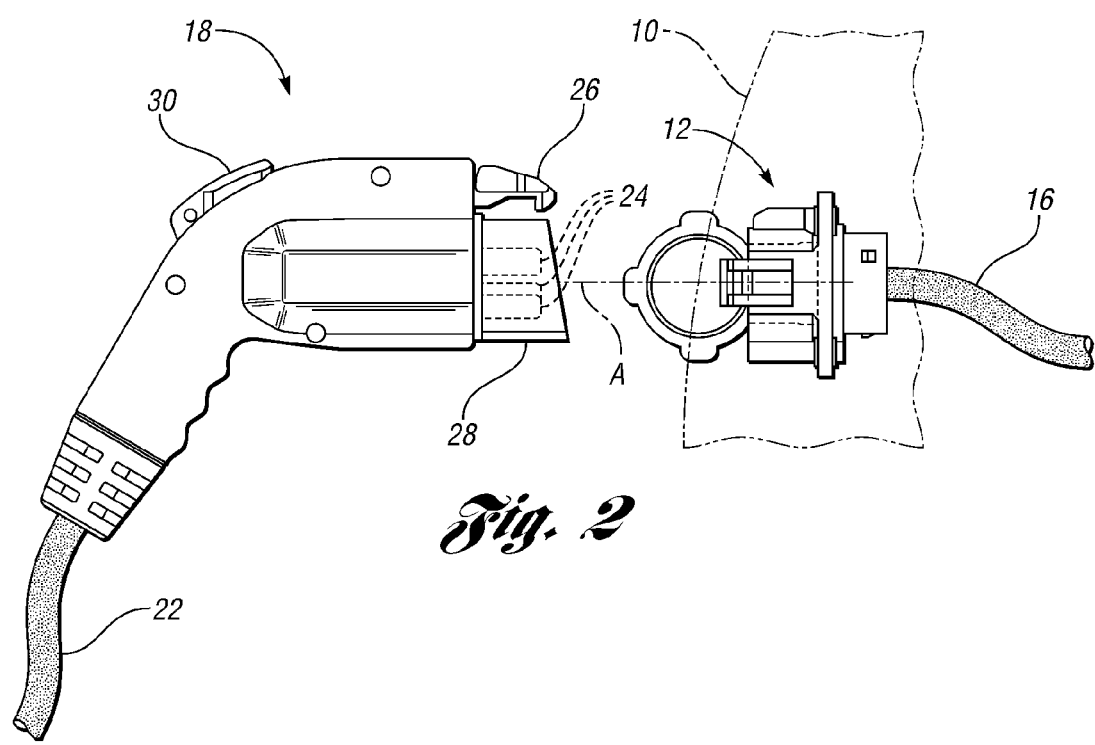
FIG. 2 is a schematic diagram illustrating the charge port on the vehicle and the electrical plug having a latching mechanism in accordance with one embodiment.

With reference to FIG. 2, one or more of the electrical contacts 24 of the plug 18 are used to transfer electric power from the power supply 20 to the electrical contacts in the charge port 12. For example, the electrical contacts 24 in the plug 18 may include an AC power pin, a neutral or secondary AC power pin, a control pilot pin, a proximity detection pin, a ground pin, or a combination thereof depending on the configuration of the charge port 12 on the vehicle 10. The electrical contacts 24 in the plug 18 may vary in size and shape. Likewise, the electrical contacts in the charge port 12 corresponding to the electrical contacts 24 in the plug 18 may vary in size and shape.

While the electrical contacts 24 in the plug 18 of FIG. 2 are shown as male contacts to mate with female electrical contacts in the charge port 12, the electrical contacts 24 may be female contacts to mate with male electrical contacts in the charge port 12. Thus, the electrical contacts in the charge port 12 may be of the male type, female type, or a combination of both types of electrical contacts depending on the configuration of the charge port 12.

As illustrated in FIG. 2, the plug 18 may have a latching mechanism 26. The latching mechanism 26 latches the plug 18 to the charge port 12 to engage and secure the plug 18 and the charge port 12 together. While the latching mechanism 26 is shown above a cylindrical cover 28 of the electrical contacts 24 in the plug 18, the latching mechanism 26 may be positioned at any suitable portion of the plug 18 to latch the plug 18 to the charge port 12 on the vehicle 10.

With continuing reference to FIG. 2, the charge port 12 may receive the cylindrical cover 28 when the plug 18 is inserted in the charge port 12. Furthermore, as the plug 18 is moved along longitudinal axis A (shown in FIG. 2) toward the charge port 12, the cylindrical cover 28 of the plug 18 may insertably guide the plug 18 into the charge port 12 as well as facilitate proper alignment of the electrical contacts 24 in the plug 18 with the electrical contacts in the charge port 12. Thus, the cylindrical cover 28 may guide movement of the plug 18 along longitudinal axis A to insert the plug 18 into the charge port 12 on the vehicle 10.

As shown in FIG. 2, the plug 18 may include a press button 30. A user can depress the press button 30 to move or pivot the latching mechanism 26 relative to the cylindrical cover 28 of the plug 18. While the latching mechanism 26 of FIG. 1 can be actuated with the press button 30, a trigger or other hand-operated device may be used to move or pivot the latching mechanism 26. When the latching mechanism 26 moves or pivots, the plug 18 may be allowed to release or disengage from the charge port 12 on the vehicle 10. Furthermore, the plug 18 can be pulled out of the charge port 12 when the plug 18 is disengaged from the charge port 12.

When latching mechanism 26 is unlatched from the charge port 12, the electrical connection between the charge port 12 and the plug 18 may be interrupted. For example, when the plug 18 is unlatched and further separated or moved away from the charge port 12, the charge port 12 and the plug 18 electrically disconnect. Thus, charging of the battery 14 may be interrupted or stopped when the plug 18 is disengaged from the charge port 12. In addition, disengagement between the plug 18 and the port 12 may give an unauthorized person access to the electric power provided by the plug 18 and/or an opportunity to remove the plug 18 from the vehicle 10.

With reference to FIG. 3, a system 40 is provided for preventing unauthorized disengagement between the electrical plug 18 and the charge port 12 on the vehicle 10. The system 40 and its method of operation are described in a general fashion to facilitate understanding of various aspects of the system 40 and method.

As shown in FIGS. 3-4, the system 40 includes at least one projection 42 and an actuator 44. The projection 42 is disposed on the vehicle 10 and has an extended locked position (as shown in FIGS. 3-4) and a retracted unlocked position. The projection 42 moves toward the actuator 44 when the projection 42 moves from the locked position to the unlocked position. In operation, the actuator 44 extends the projection 42 to the locked position and retracts the projection 42 to the unlocked position. For example, the actuator 44 may selectively extend and retract the projection 42 along longitudinal axis B as illustrated in FIGS. 3-4. To obtain the unlocked position, the projection 42 disposed on the vehicle 10 is retracted from the plug 18. The unlocked position allows disengagement of the plug 18 from the charge port 12. For example, the plug 18 may be allowed to disengage from the port 12 when the latching mechanism 26 unlatches from the port 12 and the plug 18 is pulled out of the port 12.

To obtain the locked position, the projection 42 is extended away from the actuator 44 toward the plug 18 to engage the plug 18. When the projection 42 engages the plug 18 to obtain the locked position, unauthorized disengagement of the plug 18 and the charge port 12 is prevented. When the projection 42 engages the plug 18, the projection 42 secures or fastens the plug 18 and the charge port 12 together and an electrical connection is established between electrical contacts in the charge port 12 and electrical contacts 24 in the plug 18 (shown in FIG. 2). For example, the projection 42 may engage the latching mechanism 26 of the plug 18 in one embodiment (shown in FIGS. 3-4) to prevent movement of the latching mechanism 26 when the projection 42 is in the locked position. When the projection 42 prevents movement of the latching mechanism 26, disengagement of the plug 18 from the charge port 12 is prevented. In such an example where the projection 42 is in the locked position, the latching mechanism 26 is prevented from being pivoted away from the charge port 12 to unlatch the plug 18 from the port 12 on the vehicle 10.

As illustrated in FIGS. 3-4, the projection 42 includes a contact area or distal end 46 that contacts a contact surface of the plug 18 when the actuator 44 extends the projection 42 toward the plug 18. For example, the projection 42 may contact an upper surface of the latching mechanism 26 and prevent pivotal movement of the latching mechanism 26 when the projection 42 is in the locked position. The projection 42 may be an elongated element, such as a pin or rod as illustrated in FIGS. 3-4, or a non-elongated element depending on the configuration of the system 40.

As shown in FIGS. 5-7, the at least one projection 42 of the system 40 may include a plurality of projections 42 disposed on the vehicle 10. The projections 42 have extended locked positions and retracted unlocked positions. In operation, the actuator 44 selectively extends and retracts the projections 42 between the locked and unlocked positions. For example, the actuator 44 may the simultaneously extend or retract the projections 42 so that each projection has the same position after operation of the actuator 44.

As illustrated in FIGS. 5-7, each of the projections 42 may be part of a pair of opposing projections 42. The opposing projections 42 may be in longitudinal alignment along longitudinal axis C as illustrated in FIGS. 5 and 7. Furthermore, the opposing projections 42 may be substantially rigid to facilitate breaking of the projection 42 when the plug 18 is pulled away from the charge port 12 at a substantial force. When the opposing projections 42 are in the locked position, the opposing projections 42 engage opposing sides of the plug 18 to secure or fasten the plug 18 and the charge port 12 together and prevent unauthorized disengagement of the plug 18 from the port 12.

Referring to FIG. 5, the opposing projections 42 may extend from the charge port 12 to engage inward facing sides 48 of the plug 18. For example, the opposing projections 42 may extend from a flange 50 on the charge port 12 into a recess or cavity in the sides 48 of the plug 18. While the projections 42 of FIG. 5 are shown as rods, the projections 42 may be tabs or other suitable projections to engage the plug 18.

As shown in FIG. 5, the inward facing sides 48 of the plug 18 are spaced around an exterior surface of the cylindrical cover 28. The cylindrical cover 28 and the inward facing sides 48 of the plug 18 define a gap 52. As shown in FIG. 5, the flange 50 of the charge port 12 may be received within the gap 52 when the plug 18 is inserted in the charge port 12.

As illustrated in FIG. 5, the contact area or distal end 46 of the projections 42 may have a curvature matching or substantially conforming to the outer curvature of the flange 50 to facilitate removable insertion of the plug 18 in the charge port 12. FIG. 5 depicts the locked position of the projections 42 as a result of the actuator 44 extending the projections 42 toward the inward facing sides 48, through the gap 52, and into the recess defined in the plug 18.

Referring to FIG. 6, the opposing projections 42 may be wing-like projections 54 to engage the plug 18. FIG. 6 shows the wing-like projections 54 in a retracted unlocked position. In addition, FIG. 6 shows an extended locked position of the wing-like projections 54 in phantom lines. To obtain the unlocked position, the actuator 44 retracts the wing-like projections 54 away from the plug 18, such as away from the exterior surface of the cylindrical cover 28 as illustrated in FIG. 6. To obtain the locked position, the actuator 44 extends the wing-like projections 54 toward the plug 18 to engage opposing sides of the plug 18, such as the exterior surface of the cylindrical cover 28.

As shown in FIG. 6, the system 40 may include a cam 56. The cam 56 may taper inward from a larger perimeter 58 to a smaller perimeter 60. For example, the larger and smaller perimeters 58, 60 may define diameters. In such an example, the diameter of the larger perimeter 58 is greater than the diameter of the smaller perimeter 60. In operation, the actuator 44 moves the cam 56 to engage the projections 42 and selectively extend and retract the projections 42 between the locked and unlocked positions.

In an embodiment where the system 40 includes the cam 56 to obtain the locked position, the actuator 44 may extend the projections 42 from the unlocked position to the locked position by moving the cam 56 in a direction generally away the plug 18, for example, to rotate the wing-like projections 54 toward each other to engage the cylindrical cover 28 of the plug 18. The projections 42 may slide along the cam 56 in a direction from the larger perimeter 58 to the smaller perimeter 60 as the cam 56 moves in the direction generally away from the plug 18.

In an embodiment where the system 40 includes the cam 56 to obtain the unlocked position, the actuator 44 may retract the projections 42 from the locked position to the unlocked position by moving the cam 56 in a direction generally toward the plug 18. When the cam 56 is moved in the direction generally toward the plug 18, the projections 42 may slide along the cam 56 in a direction from the smaller perimeter 60 to the larger perimeter 58 of the cam 56 for the projections 42 to obtain the unlocked position.

Referring again to FIG. 6, the cylindrical cover 28 may include a groove to receive a portion of the wing-like projections 54 to secure the plug 18 and the charge port 12 together as well as to enhance preventing unauthorized disengagement of the plug 18 from the port 12.

FIG. 7 depicts the locked position of the projections 42, such as after the actuator 44 has extended the projections 42 into the recess defined in the cylindrical cover 28 of the plug 18. When the projections 42 engages the opposing portions of the plug 18 to obtain the locked position, unauthorized disengagement of the plug 18 and the charge port 12 is prevented. The projections 42 of FIG. 7 are shown as elongated elements, such as rods or other elongated cylindrical elements.

In the locked position as shown in FIG. 7, the opposing projections 42 extend from the charge port 12 to engage opposing portions of the plug 18. For example, the opposing projections 42 may extend to engage sides of the cylindrical cover 28 of the plug 18. Furthermore, the opposing projections 42 may extend or face toward each other as shown in FIG. 7. To obtain the locked position, as shown in FIG. 7, the projections 42 extend from the actuator 44, through the flange 50 on the charge port 12, and into respective recesses or cavities in the cylindrical cover 28 of the plug 18.

The contact area or distal end 46 of the projections 42 of FIG. 7 may have a curvature matching or substantially conforming to the inner curvature of the cylindrical cover 28. The distal end 46 of the projections 42 may substantially conform to the inner curvature of the cylindrical cover 28 to increase the surface area between the projections 42 and the cylindrical cover 28. Furthermore, the distal end 46 may substantially conform to the inner curvature of the cylindrical cover 28 to enhance preventing unauthorized disengagement of the plug 18 from the port 12 without the projections 42 completely passing through the side of the cylindrical cover 28.

As illustrated in FIGS. 3-4, the system 40 may include a release mechanism 62. The release mechanism 62 operates independently of the actuator 44 to retract the projection 42 from the plug 18. For example, the release mechanism 62 may be a cable extending inside the vehicle 10 that is pulled to retract the projection 42 from the plug 18, thereby allowing disengagement of the plug 18 and the charge port 12. A person having access to inside the vehicle 10 can pull the release mechanism 62 to disengage the plug 18 and the charge port 12 without operation from the actuator 44, which may be desirable or useful in a situation where the vehicle 10 experiences a loss of electric power.

With continuing reference to FIGS. 3-4, the actuator 44 may include a mechanical device that selectively extends and retracts the projection 42 between the locked and unlocked positions based on mechanical movement of an input device 64. For example, the input device 64 may include a locking mechanism for a door in the vehicle 10. In operation, the mechanical device of the actuator 44 may extend the projection 42 to the locked position when the locking mechanism mechanically locks the door. In such an example, the locking mechanism mechanically moves the mechanical device when the locking mechanism is moved to lock the door in the vehicle 10. Similarly, the mechanical device of the actuator 44 may retract the projection 42 to the unlocked position when the door locking mechanism mechanically unlocks the door.

Referring again to FIGS. 3-4, the system 40 may include a logic device (LD) or controller 70. The controller or LD 70 can be implemented by various types or combinations of electronic devices and/or microprocessor-based computers or controllers. To implement a method of preventing unauthorized disengagement between the plug 18 and the charge port 12 on the vehicle 10, the controller 70 may execute a computer program or algorithm embedded or encoded with the method and stored in a storage medium 72. Alternatively, the controller 70 may execute logic encoded in a logic or gate array stored on one or more integrated circuit chips to execute the computer program or algorithm with the method. Although the controller 70 is shown as a single hardware device, the controller 70 may include multiple logic devices in the form of multiple hardware devices, or multiple software logic devices within one or more hardware devices.

As shown in FIGS. 3-4, the storage medium 72 (hereinafter "memory") may be volatile and/or persistent memory, such as computer-readable memory to store the computer program or algorithm embedded or encoded with the method. The memory 72 can be part of the controller 70 as shown in FIG. 1. However, the memory 72 may be positioned in any suitable location accessible by the controller 70.

As depicted in FIGS. 3-4, the actuator 44 may be an electro-mechanical actuator 44 that the controller 70 can control along communication path 74. Communication path 74 may be a wireless path or a wired connection depending on the configuration of the system 40. In operation, the controller 70 controls the electro-mechanical actuator 44 to selectively extend and retract the one or more projections 42.

The controller 70 can control the electro-mechanical actuator 44 to extend or retract the projection 42 when the controller 70 obtains authorization to respectively extend or retract the projection 42. The authorization may include a signal indicating that a specified event or action has occurred concerning the vehicle 10, a signal indicating a certain condition of the vehicle 10, a signal having a proper combination code or authorized access to control one or more operations in the vehicle 10, or a combination thereof. The controller 70 may generate the signal internally or receive the signal from an external source, such as another controller, to obtain the authorization.

The authorization for the controller 70 may include a signal indicating that a vehicle drive start request has occurred for the vehicle 10. The vehicle drive start request represents a request to start the vehicle 10, such as the electric operation of the vehicle 10, an internal combustion engine (ICE) in the vehicle 10, or a combination of both depending on the type of the vehicle 10. In such an example, the controller 70 controls the electro-mechanical actuator 44 to retract the projection 42 when the vehicle drive start request has occurred. The projection 42 may be retracted to the unlocked position to allow disengagement of the plug 18 from the charge port 12, such as to stop charging of the battery 14 or to allow the plug 18 to be completely pulled out from the charge port 12 as the vehicle 10 drives away. This may be beneficial or desirable in a situation where a user forgets to remove the plug 18 from the charge port 12 before starting the vehicle 10.

The authorization may include a signal indicating a certain driving mode of the vehicle 10. For example, a vehicle system controller (VSC) or powertrain control module (PCM) in the vehicle 10 may provide the driving mode (e.g., park, neutral, forward, and reverse) of the vehicle 10 to the controller 70. In such an example, the driving mode may be based on a signal having PRNDL position information (i.e., gear shift selection information for park, reverse, neutral, drive, low-drive). Based on the driving mode of the vehicle 10, the controller 70 can control the electro-mechanical actuator 44. For example, the controller 70 may control the electro-mechanical actuator 44 to retract the projection 42 to the unlocked position when the controller 70 obtains a signal indicating that the vehicle 10 has been shifted into drive, low-drive, or reverse. This may be beneficial or desirable in a situation where a user forgets to remove the plug 18 from the charge port 12 before driving the vehicle 10 from one location to another.

The authorization may include a signal indicating locking or unlocking of at least one door in the vehicle 10. For example, the controller 70 may control the electro-mechanical actuator 44 to retract the projection 42 to the unlocked position when the controller 70 obtains the signal indicating unlocking of a door. Similarly, the controller 70 may control the electro-mechanical actuator 44 to extend the projection 42 to the locked position when the controller 70 obtains the signal indicating locking of one or more doors in the vehicle 10.

In another example, the authorization for the controller 70 may include obtaining a condition where a predetermined code associated with the vehicle 10 matches an identification code received from a signal. For example, the signal may be generated in response to an input from a key fob, such as a command to lock or unlock a door in the vehicle 10. For example, the controller 70 may receive the identification code directly or receive and process the signal to obtain the identification code. Once the controller 70 obtains the identification code, the controller 70 may access the memory 72 to obtain the predetermined code associated with the vehicle 10 and compare the predetermined code and the identification code. When the predetermined code and the identification code match, the controller 70 may control the electro-mechanical actuator 44 to move the projection 42. For example, the controller 70 may control the electro-mechanical actuator 44 to extend the projection 42 to the locked position when a user inputs a command on a key fob associated with the vehicle 10 to lock the plug 18 to the vehicle 10, which may coincide with commanding the key fob to lock a door of the vehicle 10. Similarly, the controller 70 may control the electro-mechanical actuator 44 to retract the projection 42 to the unlocked position when a user inputs a command on the key fob to unlock the plug 18 from the vehicle 10, which may coincide with commanding the key fob to unlock the door of the vehicle 10.

In yet another example, the authorization for the controller 70 may include a signal indicating an electrical connection has been established between the plug 18 and the charge port 12. The electrical connection may be established between the electrical contacts in the charge port 12 and the electrical contacts 24 in the plug 18 (shown in FIG. 2). Whether the electrical connection has been established between the plug 18 and the charge port 12 may be determined based on the vehicle 10 receiving electric power from the power supply 20 via the charge port 12. The controller 70 may control the electro-mechanical actuator 44 to extend the projection 42 to the locked position when the controller 70 obtains the signal indicating that the electrical connection has been established between the plug 18 and the charge port 12.

Figure 8:
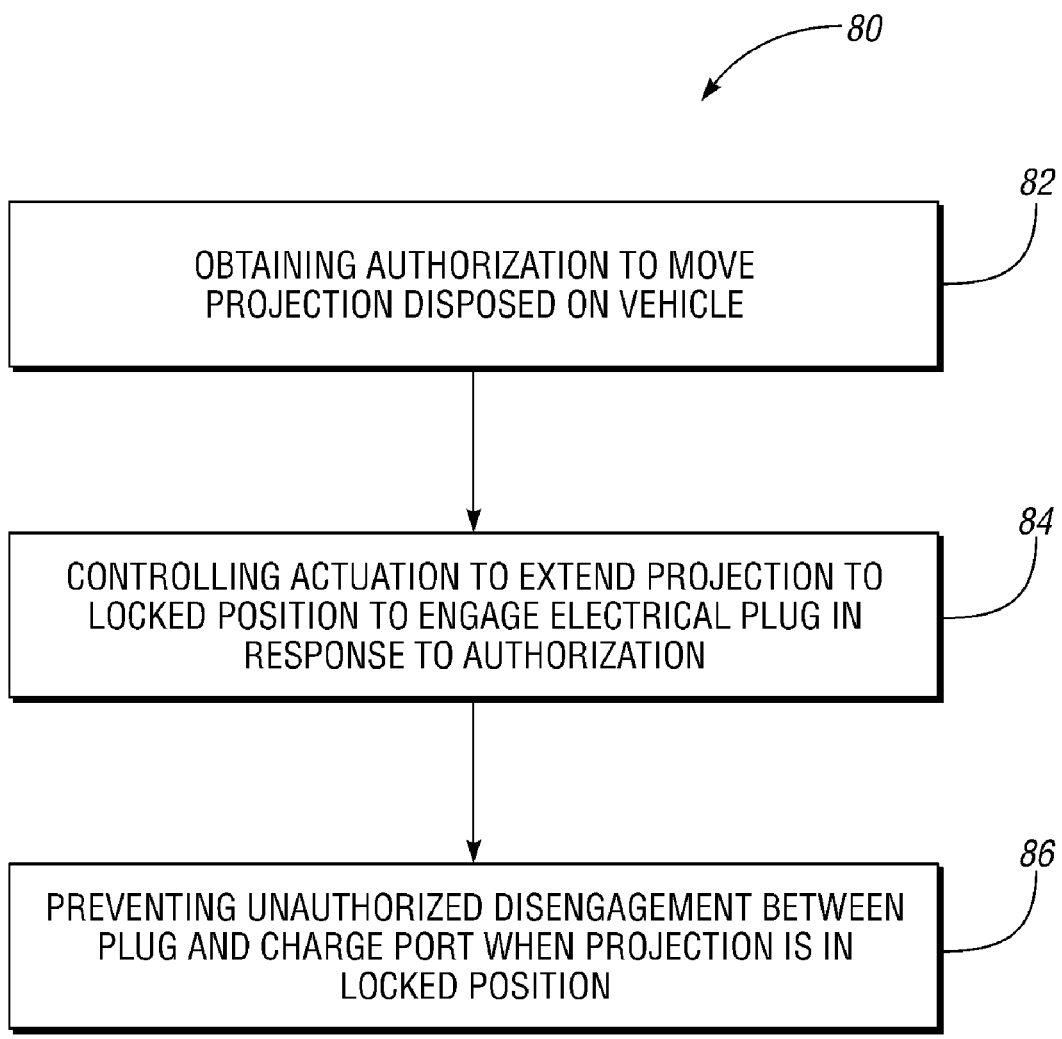
FIG. 8 is a flowchart diagram illustrating a method of preventing disengagement between an electrical plug and a charge port on an electric vehicle in accordance with one embodiment.

With reference to FIG. 8, a flowchart diagram 80 is provided to illustrate operation of a system, such as system 40, or a method of preventing unauthorized disengagement between an electrical plug and a charge port on an electric vehicle. The diagram of FIG. 8 provides a representative control strategy for preventing unauthorized disengagement between the plug and the charge port.

The control strategy or logic illustrated in FIG. 8 may be implemented by one or more logic arrays and/or a microprocessor based computer or controller. When implemented by a microprocessor based controller, the control strategy may include instructions or code processed using any of a number of known strategies such as event-driven, interrupt-driven, multi-tasking, multi-threading, and the like. Whether implemented primarily in code or hardware devices, various steps or functions illustrated may be performed in the sequence illustrated, in parallel, or in some cases omitted. Although not explicitly illustrated, one of ordinary skill in the art will recognize that one or more of the illustrated functions may be repeatedly performed depending upon the particular implementation. Similarly, the order of processing is not necessarily required to achieve the described features and advantages, but is provided for ease of illustration and description.

The control logic may be implemented in software, hardware, or a combination of software and hardware in one or more controllers and/or electronic devices depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, optical, and/or hybrid storage to keep executable instructions and associated calibration information, operating variables, and the like.

Referring to FIG. 8, the vehicle 10 and components illustrated in FIGS. 1-7 may be referenced throughout the discussion of the method to facilitate understanding of various aspects of the method.

At block 82 of flowchart diagram 80, authorization is obtained to move the projection 42 disposed on the vehicle 10. The controller 70 may obtain the authorization either internally or from a signal that the controller 70 receives external to the controller 70.

At block 84, actuation is controlled to extend the projection 42 to a locked position to engage the electrical plug 18 in response to the authorization.

At block 86, unauthorized disengagement between the plug 18 and the charge port 12 is prevented when the projection 42 is in the locked position. For example, preventing unauthorized disengagement may include engaging the latching mechanism 26 of the plug 18 to prevent movement of the latching mechanism 26 when the projection 42 is in the locked position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for preventing disengagement between an electrical plug and a charge port on an electric vehicle, the system comprising:
   at least one projection disposed on the electric vehicle and having an extended locked position and a retracted unlocked position; and
   an actuator to selectively extend and retract the projection between the locked and unlocked positions, the projection engaging the plug and preventing disengagement of the plug from the port when the projection is in the locked position;
   wherein the projection engages a latching mechanism of the plug to prevent movement of the latching mechanism when the projection is in the locked position thereby preventing disengagement of the plug from the port.

2. The system of claim 1 wherein the projection contacts a contact surface of the latching mechanism to prevent pivotal movement of the latching mechanism when the projection is in the locked position.

3. The system of claim 1 further including a release mechanism, the release mechanism retracting the projection to the unlocked position based on manual input of a user.

4. The system of claim 1 wherein the actuator includes a mechanical device to selectively extend and retract the projection between the locked and unlocked positions based on mechanical movement of an input device.

5. The system of claim 4 wherein the input device includes a locking mechanism of a door in the vehicle, the mechanical device extending the projection to the locked position when the locking mechanism locks the door.

6. The system of claim 4 wherein the input device includes a locking mechanism of a door in the vehicle, the mechanical device retracting the projection to the unlocked position when the locking mechanism unlocks the door.

7. The system of claim 1 wherein the actuator is an electro-mechanical actuator, the system further including a logic device to control the electro-mechanical actuator by selectively extending and retracting the projection.

8. The system of claim 7 wherein the logic device controls the electro-mechanical actuator to move the projection when the logic device obtains authorization from a user to move the projection.

9. The system of claim 8 wherein the electro-mechanical actuator retracts the projection to the unlocked position when the logic device obtains the authorization, the authorization including a signal indicating that a vehicle drive start request has occurred for the electric vehicle.

10. The system of claim 8 wherein the electro-mechanical actuator retracts the projection to the unlocked position when the logic device obtains the authorization, the authorization including a signal indicating a driving mode of the electric vehicle.

11. The system of claim 8 wherein the electro-mechanical actuator retracts the projection to the unlocked position when the logic device obtains the authorization, the authorization including a signal indicating unlocking of at least one door in the vehicle.

12. The system of claim 8 wherein the electro-mechanical actuator moves the projection when the logic device obtains the authorization, the logic device obtaining the authorization when a predetermined code associated with the electric vehicle matches an identification code received from a signal.

13. The system of claim 12 wherein the signal is generated in response to an input from a key fob.

14. The system of claim 8 wherein the electro-mechanical actuator extends the projection to the locked position when the logic device obtains the authorization, the logic device obtaining the authorization when an electrical connection has been established between the plug and the port.

15. A system for preventing disengagement between an electrical plug and a charge port on an electric vehicle, the system comprising:
- a plurality of projections disposed on the electric vehicle and having an extended locked position and a retracted unlocked position, each of the projections being part of a pair of opposing projections that engage opposing sides of the plug when the opposing projections are in the locked position; and
- an actuator to selectively extend and retract the projections between the locked and unlocked positions, the projections engaging the plug and preventing disengagement of the plug from the port when the projection is in the locked position.

16. The system of claim 15 further including at least one cam, the actuator moves the cam to engage the projections and selectively extend and retract the projections between the locked and unlocked positions.

17. The system of claim 15 further including a release mechanism, the release mechanism retracting the projections to the unlocked position based on manual input of a user.

18. The system of claim 15 wherein the actuator includes a mechanical device to selectively extend and retract the projections between the locked and unlocked positions based on mechanical movement of an input device.

19. The system of claim 15 wherein the actuator is an electro-mechanical actuator, the system further including a logic device to control the electro-mechanical actuator by selectively extending and retracting the projections.

20. The system of claim 19 wherein the logic device controls the electro-mechanical actuator to move the projections when the logic device obtains authorization from a user to move the projection.

* * * * *